United States Patent
Kosaka et al.

(10) Patent No.: US 8,684,118 B2
(45) Date of Patent: Apr. 1, 2014

(54) COOLING STRUCTURE FOR ELECTRICITY STORAGE DEVICE

(75) Inventors: Keishi Kosaka, Saitama (JP); Byoungju Lee, Saitama (JP); Yoshiaki Takahashi, Saitama (JP); Tohru Kuribayashi, Saitama (JP); Hidehisa Mokudai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 13/512,216

(22) PCT Filed: Oct. 29, 2010

(86) PCT No.: PCT/JP2010/069280
§ 371 (c)(1),
(2), (4) Date: May 25, 2012

(87) PCT Pub. No.: WO2011/074335
PCT Pub. Date: Jun. 23, 2011

(65) Prior Publication Data
US 2012/0247848 A1   Oct. 4, 2012

(30) Foreign Application Priority Data
Dec. 14, 2009   (JP) ................................ 2009-282842

(51) Int. Cl.
*B60K 11/08*   (2006.01)

(52) U.S. Cl.
USPC .......................... 180/68.2; 180/68.5; 62/259.2

(58) Field of Classification Search
USPC .............. 180/68.1, 68.2, 68.3, 68.5; 903/903, 903/952; 62/239, 244, 259.2; 165/202, 41, 165/42
See application file for complete search history.

(56) References Cited

U.S. PATENT DOCUMENTS

| | | | | |
|---|---|---|---|---|
| 5,432,026 A | * | 7/1995 | Sahm et al. | 429/120 |
| 5,937,664 A | * | 8/1999 | Matsuno et al. | 62/259.2 |
| 7,451,608 B2 | * | 11/2008 | Kikuchi | 62/186 |

(Continued)

FOREIGN PATENT DOCUMENTS

| | | |
|---|---|---|
| JP | 5-331753 A | 12/1993 |
| JP | 2004-001683 A | 12/2002 |

(Continued)

OTHER PUBLICATIONS

International Search Report dated Jan. 11, 2011, issued in corresponding International Application No. PCT/JP2010/069280.

(Continued)

*Primary Examiner* — John Walters
(74) *Attorney, Agent, or Firm* — Arent Fox LLP

(57) ABSTRACT

A cooling structure having a sufficient cooling efficiency in cooling an electricity storage device while securing a living space in a vehicle cabin when installed in a compact vehicle having a short distance from a rear seat to the rear end of the vehicle. A battery is contained in an IPU installed in the vehicle. The cooling structure for the battery has an air inlet opened into the vehicle cabin, an air intake duct extending from the air inlet to the IPU and a cover disposed to cover the air inlet and having a hole communicating the air intake duct with the inner side of the vehicle cabin. The air inlet has an opening inclined toward the inner side of the vehicle cabin in one side section of a rear portion of the vehicle cabin near a C-pillar located obliquely posterior to a rear seat.

6 Claims, 4 Drawing Sheets

(56) References Cited

U.S. PATENT DOCUMENTS

| | | | |
|---|---|---|---|
| 7,900,727 B2 * | 3/2011 | Shinmura | 180/68.1 |
| 7,905,307 B2 * | 3/2011 | Kubota et al. | 180/68.1 |
| 8,037,954 B2 * | 10/2011 | Taguchi | 180/65.1 |
| 8,276,696 B2 * | 10/2012 | Lucas | 180/68.2 |
| 2009/0260905 A1 | 10/2009 | Shinmura | |

FOREIGN PATENT DOCUMENTS

| | | |
|---|---|---|
| JP | 2004-001683 A | 1/2004 |
| JP | 2004-230996 A | 8/2004 |
| JP | 4114478 B2 | 4/2008 |
| JP | 4114478 B2 | 4/2008 |
| JP | 2008-141945 A | 6/2008 |
| JP | 2008-141945 A | 6/2008 |
| JP | 2008-155880 A | 7/2008 |
| JP | 2008-155880 A | 7/2008 |
| WO | WO 2007/043341 A1 | 4/2007 |
| WO | WO 2007/043341 A1 | 4/2007 |
| WO | WO 2009/081764 A1 | 7/2009 |
| WO | WO 2009/081764 A1 | 7/2009 |

OTHER PUBLICATIONS

Japanese Office Action dated Sep. 17, 2013 from Japanese Appl. No. 2011-546031, 2 pages.

* cited by examiner

COOLING STRUCTURE FOR ELECTRICITY STORAGE DEVICE

CROSS-REFERENCE TO RELATED APPLICATION

This Application is a National Stage Entry of International Application No. PCT/JP2010/069280, having an international filing date of Oct. 29, 2010; which claims priority to Japanese Application No. 2009-282842, having filed date of Dec. 14, 2009; the discloser of each of which is hereby incorporated in its entirety by reference.

TECHNICAL FIELD

The present invention relates to a cooling structure for an electricity storage device, particularly a vehicular electricity storage device mounted in a hybrid vehicle or an electric automobile.

BACKGROUND ART

In recent years, a hybrid vehicle or an electric automobile has been in practical use widely. In such hybrid vehicle or the like, an electricity storage device of a large capacity is mounted for supplying electrical power to an electrical motor or the like. A battery capable of being charged or discharged repeatedly is used in the electricity storage device, and heat is radiated every time when the battery is charged or discharged.

However, the temperature rise of the battery brings adverse effects such as deteriorating the performance or working life and the like. Further, the temperature rise of the battery brings such a problem that the power saving function is activated to limit the power force output from the battery, which deteriorates the power performance of the vehicle. Furthermore, the temperature rise of the battery brings such a problem that the working frequency of a fan for cooling the battery is increased, which deteriorates the air conditioning performance of the vehicle cabin.

Conventionally, in order to inhibit the temperature rise of the battery, the air cooled down by an air conditioner in the vehicle cabin is supplied through an air intake duct (cooling air passage) to cool the battery. Generally, from the viewpoint of space saving and cooling efficiency, an air inlet of the air intake duct is disposed relatively adjacent to the battery. For example, it has been taken into consideration to dispose the air inlet in a garnish aside a rear seat or in the rear seat itself.

If the battery is mounted on a floor of a luggage room in a hatchback vehicle, wagon vehicle or the like, in order to prevent stacked luggage from blocking the air inlet, Patent document 1 has disclosed a technique to dispose the air inlet in a platform portion of a rim on a side section of the luggage room, which is located at a higher position than a tonneau cover.

CITATION LIST

Patent Documents

Patent document 1: U.S. Pat. No. 4,114,478

SUMMARY OF INVENTION

Technical Problem

However, in a compact vehicle, if the air inlet is disposed in the garnish aside the rear seat or in the rear seat itself, it narrows the rear seat, which makes it impossible to secure a sufficient living space in the vehicle cabin.

Further, if the configuration disclosed in Patent document 1 is adopted in a compact vehicle, since the distance from the rear seat to the rear end of the vehicle is short, it is impossible to secure a sufficient distance between a C-pillar disposed obliquely posterior to the rear seat and the air inlet. In this case, if the air inlet is disposed at a posterior position adjacent to the C-pillar, it is obstructed by the C-pillar; thereby, the cooling air may not be introduced sufficiently from the air let, which brings a problem of deteriorating the cooling efficiency of the battery.

The present invention has been accomplished in view of the aforementioned problems, and it is therefore an object of the present invention to provide a cooling structure having a sufficient cooling efficiency in cooling an electricity storage device while securing a living space in a vehicle cabin even if the cooling structure is installed in a compact vehicle having a short distance from the rear seat to the rear end of the vehicle.

Solution to Problem

The cooling structure for electricity storage device of the present invention is configured to cool an electricity storage device mounted in a vehicle and comprises: an air inlet opened into a vehicle cabin, a cooling air passage extending from the air inlet to the electricity storage device, and a cover being disposed to cover the air inlet and formed with a hole to communicate the cooling air passage with the inner side of the vehicle cabin, wherein the air inlet is disposed to have an opening thereof inclined toward the inner side of the vehicle cabin in one side section of a rear portion of the vehicle cabin in the vicinity of a pillar which is located obliquely posterior to a rear seat.

According to the present invention, the air inlet in one side section of a rear portion of the vehicle cabin in the vicinity of the pillar which is located obliquely posterior to the rear seat; therefore, the presence of the air inlet will not affect the living space in the vehicle cabin. Even in a compact vehicle having a short distance from the rear seat to the rear end thereof, it is possible to dispose the air inlet with a good looking. Furthermore, the sound for sucking the cooling air from the vehicle cabin into the cooling air passage through the hole in the cover can be proofed by the pillar; thereby, the noise sensed by an occupant in the rear seat can be reduced.

Normally, there is such a possibility that the air inlet is obstructed by the pillar and the cooling air in the vehicle cabin may not be introduced sufficiently into the cooling air passage; however, in the cooling structure of the present invention, the air inlet is disposed to have the opening thereof inclined toward the inner side of the vehicle cabin. Accordingly, it is possible to introduce sufficient cooling air from the vehicle cabin into the cooling air passage, which makes better the cooling efficiency of the electricity storage device. The vehicle cabin of the present invention includes a luggage room joined with the vehicle cabin.

In the present invention, it is preferred that the cover be disposed on a horizontal surface of a garnish configured to support a windshield posterior to the pillar, and the hole be disposed in a horizontal surface of the cover. Accordingly, it is easy to dispose the cover and the hole.

In the present invention, it is preferred that a part of the pillar positioned anterior to the cover be cut out. Accordingly, it is possible to further introduce the cooling air from the vehicle cabin into the cooling air passage, which makes further better the cooling efficiency of the electricity storage device.

In the present invention, it is preferred that the cooling air passage be disposed to pass through one side section of the vehicle cabin along an upper surface of a floor panel, and an insulation material be disposed to surround the cooling air passage.

Accordingly, the cooling air passage does not protrude into the vehicle cabin, the living space can be secured sufficiently in the vehicle cabin. Further, even the temperature around the cooling air passage is high, the heat radiation from the outer side of the cooling air passage to the inner side thereof is prevented; thereby, the temperature rise of the cooling air passing through the cooling air passage is inhibited, which makes further better the cooling efficiency of the electricity storage device.

In the present invention, it is preferred that a cross-sectional area of the cooling air passage increase from the air inlet to the electricity storage device. Accordingly, it is possible to reduce the pressure loss (flow resistance) of the cooling air in the cooling air passage, which makes further better the cooling efficiency of the electricity storage device.

In the present invention, it is preferred that the cooling air passage be disposed to connect the air inlet and the electricity storage device at a minimum distance. Accordingly, it is possible to reduce the pressure loss of the cooling air in the cooling air passage, which makes further better the cooling efficiency of the electricity storage device. However, it is necessary to dispose the cooling air passage by taking into consideration the installation thereof to the vehicle.

In the present invention, it is preferred that the cover be positioned away from the air inlet, and a different hole be disposed in a side surface of the cover toward the inner side of the vehicle cabin to communicate the cooling air passage with the inner side of the vehicle cabin. Accordingly, it is possible to introduce the cooling air from the inner side of the vehicle cabin into the cooling air passage, which makes further better the cooling efficiency of the electricity storage device.

In the present invention, it is preferred that the part of the pillar positioned anterior to the cover be cut out to incline backward. Accordingly, it is possible to introduce the cooling air from the vehicle cabin into the cooling air passage with the strength of the pillar being secured, which makes further better the cooling efficiency of the electricity storage device.

In the present invention, it is preferred that the insulation material be a bonded fabric and be adhered to the cooling air passage through ultrasonic welding. Accordingly, the insulation material can be adhered to the cooling air passage without leaving adhesion traces on the inner side of the cooling air passage or opening a hole in the cooling air passage and without increasing the sucking sound as well.

DESCRIPTION OF EMBODIMENTS

Hereinafter, a vehicle 1 installed with a cooling structure for an electricity storage device according to an embodiment of the present invention will be described.

Figure 1:
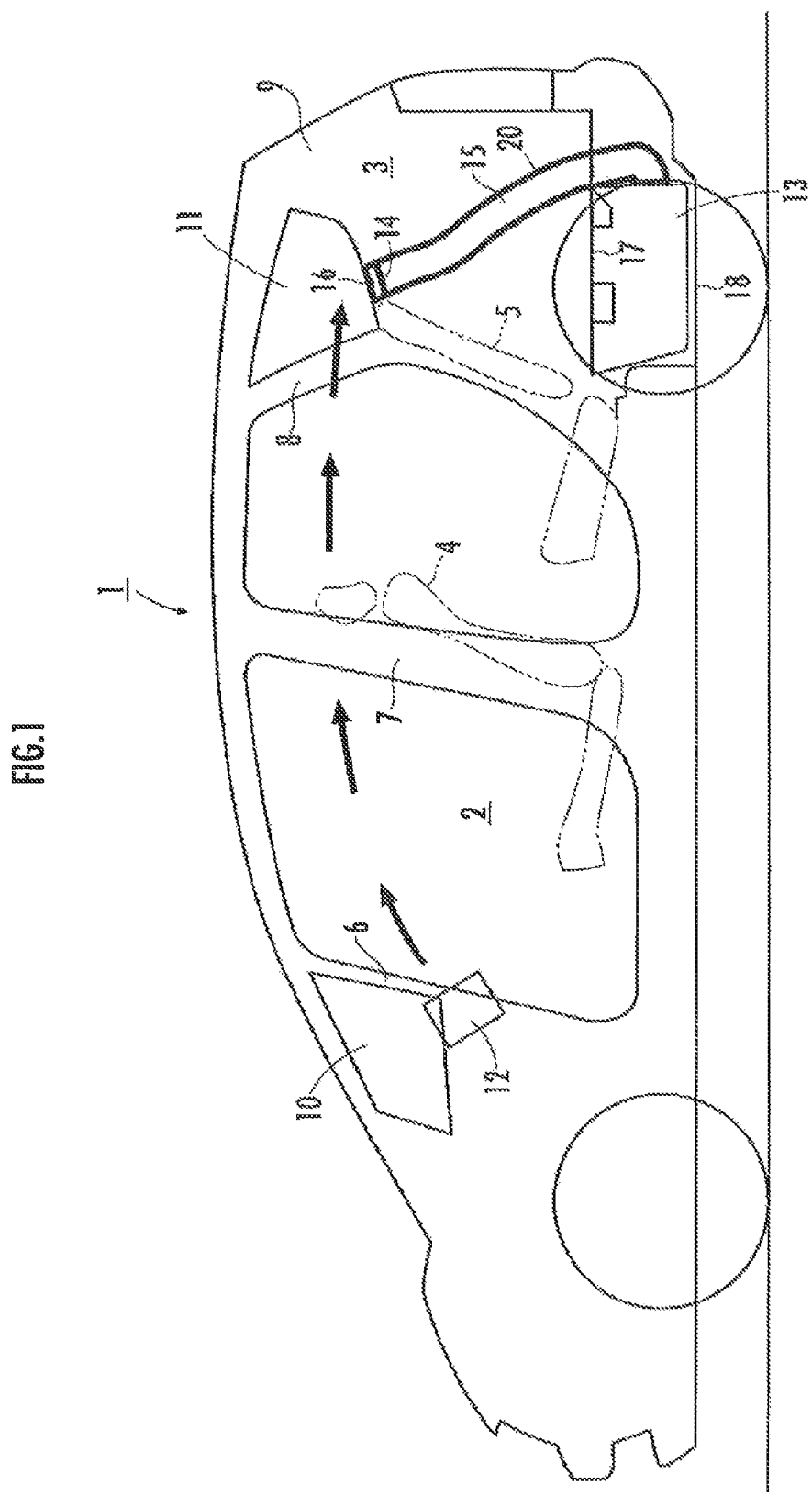
FIG. 1 is a view illustrating a vehicle installed with a cooling structure for an electricity storage device according to an embodiment of the present invention.

The vehicle 1 in FIG. 1 is a hybrid vehicle provided with an internal combustion engine such as a gasoline engine, a diesel engine or the like, and an electric motor (motor or generator) as a power-generating source. The vehicle 1 is configured to have a vehicular axle to be driven by the power transmitted from the internal combustion engine and/or the motor via a power transmitting device (transmission). In addition, the vehicle is also configured to have the power transmitted from the internal combustion engine and/or the vehicular axle to the motor so as to make the motor to operate in a regenerative operation mode.

The vehicle 1 is a compact hatchback vehicle having a hinged rear door that opens upward (hatch) or a hinged rear window that opens upward (glass hatch), and shares a two-box design where a vehicle cabin 2 which is a space for boarding an occupant and a luggage room which is a space mainly for boarding luggage are not partitioned.

The vehicle 1 is disposed with a front seat 4 and a rear seat 5 in the vehicle cabin 2 for seating the occupants. Although not shown in the drawings, a front seat door having a window is disposed for the front seat 4 and a rear seat door having a window is disposed for the rear seat 5. The luggage room 3 is disposed posterior to the rear seat 5. Hereinafter, both the vehicle cabin 2 and the luggage room 3 are collectively called as the vehicle cabin 2.

The lateral sides of the vehicle 1 is disposed with a plurality of pillars (support columns) configured to support the roof and the roof panel to form the vehicle cabin. In the sequence from the front side, there are disposed with an A-pillar 6 which is also called as the front pillar, a B-pillar 7 which is also called as the central pillar, a C-pillar 8 which is also called as the quarter pillar, and a D-pillar 9 which is also called as the rear pillar or the tail-gate pillar.

A front glass (front windshield) 10 is disposed anterior to the A-pillar 6 of both sides. A rear quarter glass (rear quarter windshield) 11 is disposed between the C-pillar 8 and the D-pillar 9 of both sides. Thus, the A-pillar is positioned between the front glass 10 and the front seat door, the B-pillar 7 is positioned between the front seat door and the rear seat door, and the C-pillar 8 is positioned between the door glass of the rear seat door and the rear quarter glass 11.

Moreover, an air conditioning device (air conditioner) 12, which is configured to introduce tempered air flow toward the rear side of the cabin 2, is disposed in an instrument panel.

The cooling structure for electricity storage device according to an embodiment of the present invention is configured to cool an intelligent power unit (hereinafter, referred to as IPU) 13 installed in the vehicle 1 and is provided with an air inlet 14 opened into the cabin 2, an air intake duct 15 extending from the air inlet 14 to the IPU 13, and a cover 16 being disposed to cover the air inlet 14 and formed with a hole 16a (refer to FIG. 2) to communicate the air intake duct 15 with the inner side of the vehicle cabin 2.

The IPU 13 is electrically connected to the motor and is composed of a battery (a direct-current power supply or a secondary battery) serving as the electricity storage device and a power control unit (hereinafter, referred to as PCU). The IPU 13 is disposed below a floor board 17 and above a floor panel 18 in the luggage room 3.

The battery, for example, is composed of a battery module having plural battery cells such as lithium ion batteries, nickel hydride batteries or the like connected in series.

The PCU is a drive circuit for the motor composed of, for example, a power drive unit (hereinafter, referred to as PDU), a voltage conversion unit, and an electronic control unit (hereinafter, referred to as ECU). The voltage conversion unit includes an inverter which converts a direct-current or alternating-current voltage between the motor and the battery and a DC/DC converter which adjusts the alternating current voltage. The ECU is electrically connected to each component of the vehicle 1, such as the PDU, the internal combustion engine, the motor, the power transmission device and the like, and is configured to control the components individually. The ECU is an electronic circuit unit composed of a CPU (Central Processing Unit), a RAM (Random Access Memory), a ROM (Read Only Memory), an interface circuit and the like.

Due to the heat released from chemical reactions in the battery cells, the Joule heat, and the heat radiated from heat radiation elements called as power semiconductors in the PCU, the temperature of the IPU 13 rises. The temperature rise of the battery in the IPU 13 brings adverse effects such as deteriorating the performance or working life and the like of the battery, it is needed to be cooled down. Therefore, the air inside the vehicle cabin 2 which has a relatively lower temperature or the cooling air supplied from the air-conditioning device (hereinafter, referred to as the cooling air together) is introduced via the cover 16, the air intake duct 15 into the IPU 13 to cool the IPU 13.

Although not shown in the drawings, there is also provided an exhaust air duct, namely an air passage for discharging the hot air in the IPU 13 outside the vehicle 1. The exhaust air duct is disposed with a suction fan, for example a sirrocco fan, to suck the air from the IPU 13. In addition, it is also acceptable to dispose a blast fan in the air intake duct 15 to blast the cooling air toward the IPU 13.

The air intake duct 15 is a cooling air passage configured to introduce the cooling air in the vehicle cabin 2 from the air inlet 14 through the hole 16a in the cover 16 into the IPU 13. The air intake duct 15 is constituted from a single resin member or by joining plural resin members together. The air intake duct 15 is a tubular member, a cross sectional profile thereof has a roughly circular shape, and an opening at one end thereof becomes the air inlet 14. The air inlet 14 is disposed in one side section of a rear portion of the vehicle cabin 2 in the vicinity of the C-pillar 8. The other opening at the other end of the air intake duct 15 is connected to a casing of the IPU 13. However, the cross sectional profile of the air intake duct 15 is not limited to a roughly circular shape; it is acceptable for it to be an appropriate shape such as an elliptical shape, a rectangular shape, a polyangular shape excluding the rectangular shape, or the like.

As the fan mentioned above is actuated, the air in the exhaust air duct is discharged outside the vehicle 1. Thereby, the air flow as illustrated by the arrows in FIG. 1 is generated in the air intake duct 15, namely the cooling air inside the vehicle cabin 2 is supplied to the IPU 13 via the cover 16 and the air intake duct 15 to take away the heat generated in the battery or the like in the IPU 13 so as to cool the IPU 13.

Figure 2:
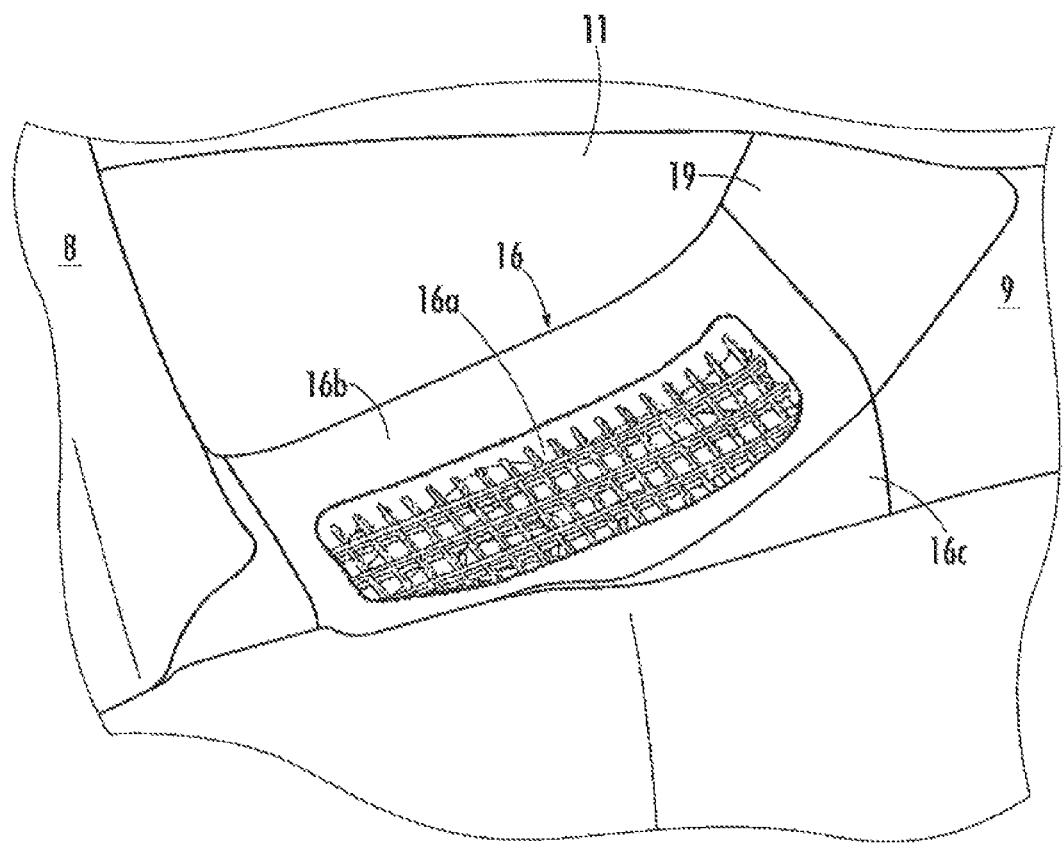
FIG. 2 is a perspective view illustrating the surroundings of a cover.
Figure 3:
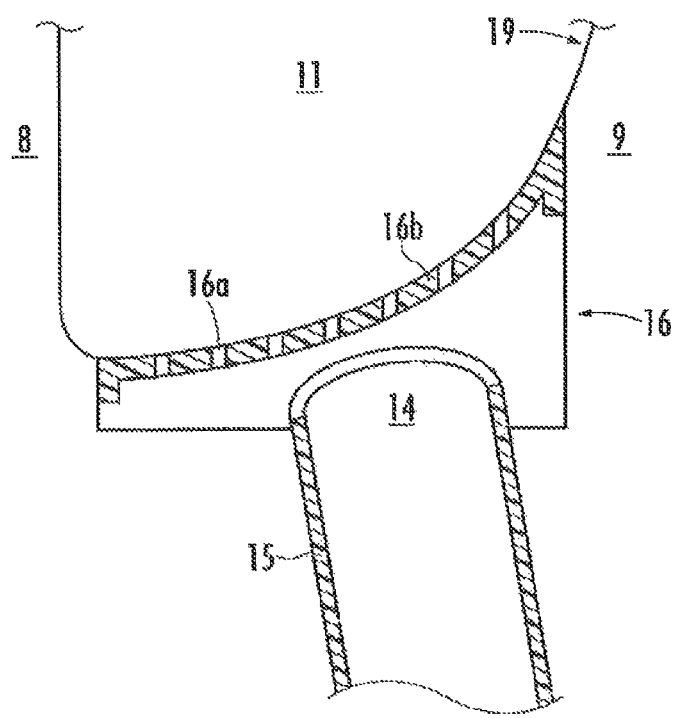
FIG. 3 is a vertical cross-sectional view illustrating the surroundings of the cover.

As illustrated in FIG. 2 and FIG. 3, the cover 16 is disposed at one side section of a rear portion of the vehicle cabin 2 in the vicinity of the C-pillar 8 so as to cover the air inlet 14. In the present embodiment, the cover 16 is assembled as a part into a rear quarter garnish 19 which is a built-in resin component configured to support the rear quarter glass 11.

The cover 16 has a horizontal surface 161 which is roughly horizontal and facing the vehicle cabin 2, and is disposed with a clearance present between the horizontal surface 16b and the air inlet 14. The horizontal surface 16b of the cover 16 is formed with the hole 16a penetrated from the upper face to the back face to communicate the vehicle cabin 2 and the air intake duct 15. In the present embodiment, a plurality of rectangular holes 16a are disposed in a lattice pattern. However, it is acceptable that the hole 16a is only one or of a small number. Moreover, it is also acceptable that the hole 16a is formed into an appropriate shape such as a circular shape, an elliptical shape, a rectangular shape, a polyangular shape excluding the rectangular shape, or the like.

Since the air inlet 14 and the cover 16 are disposed at one side section of a rear portion of the vehicle cabin 2 in the vicinity of the C-pillar 8, even though the vehicle 1 is a compact vehicle having a short distance from the rear seat 5 to the rear end thereof, it is possible to dispose the air inlet 14 and the cover 16 with a good looking. Furthermore, since the air inlet 14 is disposed behind the C-pillar 8, the sound for sucking the cooling air into the air intake duct 15 is proofed by the C-pillar 8; thereby, the noise sensed by an occupant in the rear seat 5 is reduced.

However, since the air inlet 14 is disposed behind the C-pillar 8, it may be obstructed by the C-pillar 8; thereby, sufficient cooling air may not be introduced from the vehicle cabin 2 into the air intake duct 15. In the present embodiment, the air inlet 14 is disposed to have the opening inclined from an upper position toward the inner side of the vehicle cabin 2. Accordingly, sufficient cooling air can be introduced from the vehicle cabin 2 into the air intake duct 15.

Figure 4:
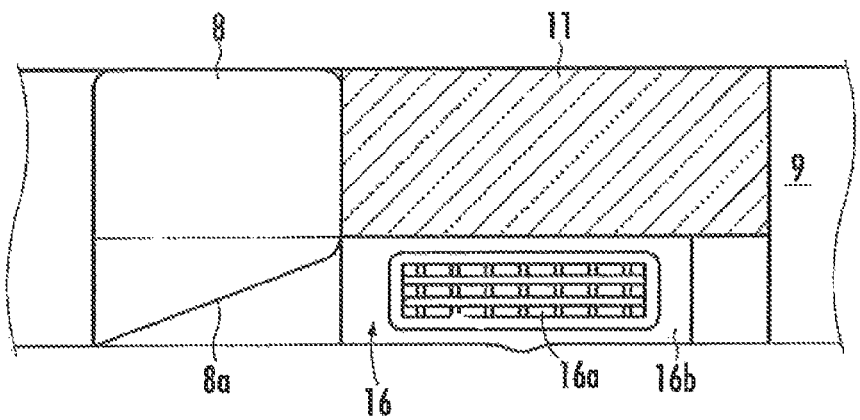
FIG. 4 is a roughly horizontal cross-sectional view illustrating the surroundings of the cover.

Further, as illustrated in FIG. 4, a part of the C-pillar 8 positioned anterior to the cover 16 is cut out. In the present embodiment, a cutout 8a is formed so that the C-pillar 8 inclines backward. Accordingly, the cooling air can flow along the cutout 8a, which further improves the introduction of the cooling air into the air intake duct 15.

In addition, if the strength or the like is not a problem, as illustrated by the chain line in FIG. 4, it is acceptable to form a cutout on a part of the C-pillar 8 positioned anterior to the cover 16 so that the inner side section of the vehicle of the C-pillar 8 is thinned uniformly. It is also acceptable to form the cutout only on a part of the C-pillar 8 on the inner side of the vehicle 1 at a rear side of the vehicle 1.

With reference to FIG. 1, the air intake duct 15, in consideration of the installation thereof to the vehicle 1, is globally curved but configured to extend as much as possible in a straight line without abrupt curves so as to join the air inlet 14 and the IPU 13 at the shortest distance as much as possible. Specifically, the air intake duct 15 is formed to extend downward from the air inlet 14 through one side section of the vehicle 1 and thereafter extend along an upper surface of the floor panel 18.

Accordingly, the air intake duct 15 will not protrude out of the vehicle cabin 2, which secures sufficient living space in the vehicle cabin 2. Moreover, it is possible to reduce the pressure loss (flow resistance) of the cooling air, which makes it possible to cool the IPU 13 more efficiently.

Further, the air intake duct 15 is formed to have the cross-sectional area thereof increased from the air inlet 14 to the IPU 13. Accordingly, it is possible to further reduce the pressure loss (flow resistance) of the cooling air, which makes it possible to cool the IPU 13 more efficiently.

However, if the ambient temperature of the air intake duct 15 is high, the heat is radiated from the outer side of the air intake duct 15 to the inner side thereof, which makes the temperature of the cooling air supplied to the IPU 13 to rise remarkably. Thereby, it is impossible to cool the 13 efficiently. In the present embodiment, an insulation material 20 composed of glass fiber, bonded fabric and the like is disposed around the outer surface of the air intake duct 15 to insulate the heat radiation between the inner space of the air intake duct 15 and the outer space around the air intake duct 15.

Accordingly, even the ambient temperature of the air intake duct 15 is high, the heat radiation from the outer side of the air intake duct 15 to the inner side thereof is prevented; thereby, the temperature rise of the cooling air is inhibited, which makes it possible to cool the IPU 13 more efficiently. In addition, it is preferable that the insulation material 20 be disposed to cover the entire outer surface of the air intake duct 15; however, it is acceptable to cover a partial outer surface thereof as well.

In the present embodiment, a Thinsulate (registered trademark, manufactured by Sumitomo 3M Limited), which is a bonded fabric insulation material having the ultrafine fibers of polypropylene (PP) reinforced with polyester fibers, is used as the insulation material 20. The insulation material 20 is adhered to the air intake duct 15 at plural locations by the way of ultrasonic welding from the outer side of the insulation material 20. Accordingly, there are no adhesion traces left on the inner side of the air intake duct 15 or holes opened in the air intake duct 15, therefore, the suction sound will not be increased.

Figure 5:
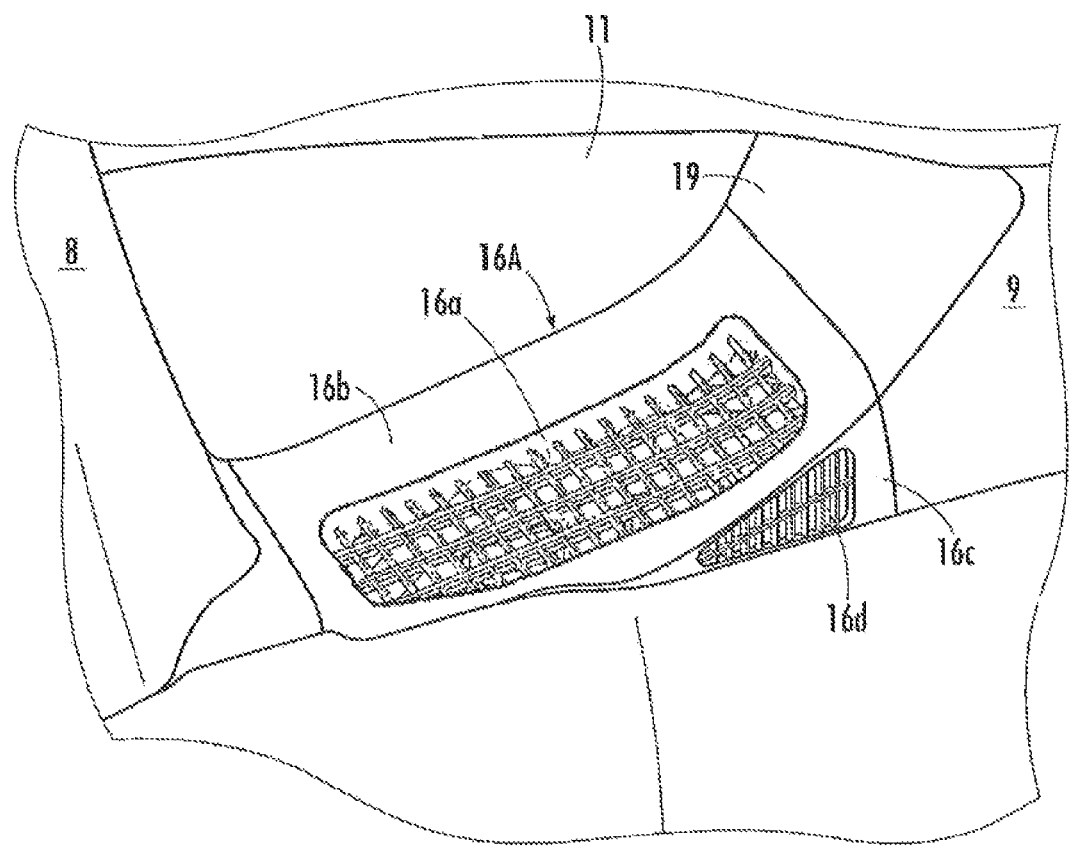
FIG. 5 is a perspective view illustrating the surroundings of a cover in a cooling structure for an electricity storage device according to another embodiment of the present invention.

The cooling structure for electricity storage device according to another embodiment of the present invention will be described with reference to FIG. 5. The present embodiment is the same as the above-mentioned embodiment except that a cover 16A is different.

The cover 16A is formed to have another hole 16*d* penetrated from the outer face of a side superficial wall 16*c* positioned on the inner side of the vehicle cabin through the back face thereof to communicate the air intake duct 15 with the vehicle cabin 2. In the present embodiment, a plurality of rectangular holes 16*d* are disposed in a lattice pattern. However, it is acceptable that the hole 16*d* is only one or of a small number; it is also acceptable that the hole 16*d* is formed into an appropriate shape such as a circular shape, an elliptical shape, a rectangular shape, a polyangular shape excluding the rectangular shape, or the like. Moreover, the portion formed with the holes 16*a* and the portion formed with the holes 16*d* may be disposed in succession.

Although the cooling structure for electricity storage device is described in the above according to the embodiments of the present invention, the cooling structure for electricity storage device of the present invention is not limited to the embodiments in the drawings, various appropriate modifications are possible.

For example, in the above embodiments, the cooling structure for electricity storage device is described to be installed in a hybrid vehicle. However, the vehicle where the cooling structure for electricity storage device of the present invention is installed is not limited to a hybrid vehicle; it may be an electric automobile or a fuel battery vehicle.

Further, in the above embodiments, the description is carried out by using the IPU 13 as the electricity storage device to be cooled. However, the electricity storage device is not limited to the IPU 13. For example, it is acceptable to cool only a battery. In addition to the battery, it is also acceptable to cool a capacity together with the battery.

The invention claimed is:

1. A cooling structure for electricity storage device configured to cool an electricity storage device mounted in a vehicle and comprising:
   an air inlet opened into a vehicle cabin,
   a cooling air passage extending from the air inlet to the electricity storage device, and
   a cover being disposed to cover the air inlet and formed with a hole to communicate the cooling air passage with the inner side of the vehicle cabin,
   wherein the air inlet is disposed to have an opening thereof inclined toward the inner side of the vehicle cabin in one side section of a rear portion of the vehicle cabin in the vicinity of a pillar which is located obliquely posterior to a rear seat, and
   wherein the cover is disposed on a horizontal surface of a garnish configured to support a windshield posterior to the pillar, and the hole is disposed in a horizontal surface of the cover.

2. The cooling structure for electricity storage device according to claim 1, wherein
   a part of the pillar positioned anterior to the cover is cut out.

3. The cooling structure for electricity storage device according to claim 2, wherein
   the part of the pillar positioned anterior to the cover is cut out to incline backward.

4. The cooling structure for electricity storage device according to claim 1, wherein
   the cooling air passage is disposed to pass through one side section of the vehicle cabin along an upper surface of a floor panel, and
   an insulation material is disposed to surround the cooling air passage.

5. The cooling structure for electricity storage device according to claim 4, wherein
   the insulation material is a bonded fabric and is adhered to the cooling air passage through ultrasonic welding.

6. The cooling structure for electricity storage device according to any of claim 1, wherein
   the cover is positioned away from the air inlet, and
   a different hole is disposed in a side surface of the cover toward the inner side of the vehicle cabin to communicate the cooling air passage with the inner side of the vehicle cabin.

* * * * *